(12) United States Patent
Mendoza et al.

(10) Patent No.: US 10,885,587 B1
(45) Date of Patent: Jan. 5, 2021

(54) CATASTROPHE RESOURCE SYSTEM

(71) Applicant: Allstate Insurance Company, Northbrook, IL (US)

(72) Inventors: Brandon F. Mendoza, Arlington Heights, IL (US); David J. Krug, Arlington Heights, IL (US); Bryan Keith Corder, Gurnee, IL (US)

(73) Assignee: Allstate Insurance Company, Northbrook, IL (US)

( * ) Notice: Subject to any disclaimer, the term of this patent is extended or adjusted under 35 U.S.C. 154(b) by 319 days.

(21) Appl. No.: 15/138,691

(22) Filed: Apr. 26, 2016

Related U.S. Application Data

(60) Provisional application No. 62/157,124, filed on May 5, 2015.

(51) Int. Cl.
*G06Q 40/08* (2012.01)
*H04W 4/021* (2018.01)
*H04W 4/90* (2018.01)

(52) U.S. Cl.
CPC ........... *G06Q 40/08* (2013.01); *H04W 4/021* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 7,268,691 B2 * | 9/2007 | Koors | G01P 5/04 340/601 |
| 8,219,535 B1 | 7/2012 | Kobori et al. | |
| 9,772,428 B2 * | 9/2017 | Asrani | G01W 1/10 |
| 2004/0089727 A1 | 5/2004 | Baharav et al. | |
| 2004/0145481 A1 | 7/2004 | Dilbeck et al. | |
| 2005/0027571 A1 | 2/2005 | Gamarnik et al. | |
| 2012/0029946 A1 * | 2/2012 | Aquila | G06Q 40/02 705/4 |

(Continued)

FOREIGN PATENT DOCUMENTS

EP 2722693 B1 * 10/2012 ............. G01W 1/10

OTHER PUBLICATIONS

"Real-Time Environmental Monitoring and Notification for Public Safety" dated Apr. 2010 by Doree Duncan Seligmann published in IEEE Multimedia.*

(Continued)

*Primary Examiner* — Alexander G Kalinowski
*Assistant Examiner* — Blane A Lickteig
(74) *Attorney, Agent, or Firm* — Banner & Witcoff, Ltd.

(57) ABSTRACT

A system comprising a plurality of mobile devices, an insurance policy database, and a server is disclosed. The server may be configured to receive barometric data from one or more sensors in each of the plurality of mobile devices, identify that the barometric data indicates an occurrence of at least one catastrophic event, identify a geographic region affected by the at least one catastrophic event, access the insurance policy database to determine a number of insurance policies in the geographic region, estimate a number of catastrophe resources needed to handle the number of insurance policies in the geographic region, and assign at least one of the catastrophe resources to each of the insurance policies in the geographic region.

20 Claims, 4 Drawing Sheets

(56) References Cited

U.S. PATENT DOCUMENTS

| | | | |
|---|---|---|---|
| 2014/0350883 A1* | 11/2014 | Carter .................. | A61B 5/6802 |
| | | | 702/141 |
| 2015/0170288 A1* | 6/2015 | Harton ................... | G06Q 40/08 |
| | | | 705/4 |
| 2015/0319578 A1* | 11/2015 | Edge ..................... | H04W 4/025 |
| | | | 455/456.6 |

OTHER PUBLICATIONS

Jan. 3, 2013—(U.S.) Office Action—U.S. Appl. No. 13/419,916.
Apr. 9, 2013—(U.S.) Office Action—U.S. Appl. No. 13/419,916.
Sep. 9, 2014—(U.S.) Office Action—U.S. Appl. No. 13/419,916.
Mar. 24, 2015—(U.S.) Office Action—U.S. Appl. No. 13/419,916.
Jan. 5, 2016—(U.S.) Office Action—U.S. Appl. No. 13/419,916.
Jul. 15, 2016—(U.S.) Office Action—U.S. Appl. No. 13/419,916.

* cited by examiner

CATASTROPHE RESOURCE SYSTEM

CROSS-REFERENCE TO RELATED APPLICATIONS

This application claims the benefit of U.S. Provisional Patent Application Ser. No. 62/157,124, filed May 5, 2015, and entitled "Catastrophe Resource System," which is incorporated by reference herein in its entirety.

BACKGROUND

Catastrophes such as natural disasters may occur unexpectedly, resulting in devastating damages for individuals within proximity of a catastrophic event. For example, an individual may undergo unfortunate losses of property, such as damage to his or her home by a hurricane or a tornado. After an individual has incurred such losses, that individual may be eager to begin financial recovery by filing an insurance claim with an insurance company.

Typically, the insurance company may try to handle the insurance claim with reasonable timeliness but may be hampered by the volume and inherent complexity of insurance claims and the limitations of conventional systems. Additionally, the insurance company may send out resources, such as claim adjusters, to regions affected by a catastrophic event to verify damage to a property and to assist customers or users in processing their insurance claims. Although insurance companies empathize with their customers and try to resolve claims promptly, they have historically faced resource availability and technological constraints. The occurrence of one or more catastrophic events may severely limit the availability of resources and/or increase the time required to resolve insurance claims.

Depending on the severity of a catastrophic event, the region affected, and the number of customers affected, resources for reviewing and processing claims may be limited. For example, when a catastrophic event (e.g., a natural disaster, etc.) occurs, many regions and people may be affected, increasing the number of claims the insurance company has to process. Numerous resources may need to be scheduled, dispatched, and managed in an efficient manner to ensure customers receive timely cost-effective service.

Furthermore, catastrophes may be unexpected, and an insurance company might not be able to respond to requests for claims processing and dispatch resources quickly in order to address damages left by unexpected catastrophes. It may also be difficult for the insurance company to identify specific regions that have been affected by a natural disaster in order to dispatch an adequate number of resources to each of the specific regions. Thus, scheduling, allocation, and management of resources after catastrophes still need improvement. As such, new systems, methods, and devices may be desired to assist in providing resources to customers in catastrophes in a timely and efficient manner.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for providing a catastrophe resource system in order to detect natural disasters and other catastrophes using mobile devices. The disclosure describes a system comprising a plurality of mobile devices, an insurance policy database, and a server including one or more processors and at least one memory storing computer-readable instructions. The server may be configured to receive barometric data from one or more sensors in each of the plurality of mobile devices, identify that the barometric data indicates an occurrence of at least one catastrophic event, identify a geographic region affected by the at least one catastrophic event, access the insurance policy database to determine a number of insurance policies in the geographic region, estimate a number of catastrophe resources needed to handle the number of insurance policies in the geographic region, and assign at least one of the catastrophe resources to each of the insurance policies in the geographic region.

The disclosure also describes an apparatus comprising at least one processor, a network interface configured to communicate, via a network, with a plurality of mobile devices, and a memory storing computer-readable instructions that, when executed by the at least one processor, cause the apparatus to receive barometric data from each of the plurality of mobile devices, wherein each mobile device comprises one or more sensors, identify, by the at least one processor, that the barometric data indicates an occurrence of at least one catastrophic event, identify, by the at least one processor, a geographic region affected by the at least one catastrophic event, access an insurance policy database to determine a number of insurance policies in the geographic region, estimate, by the at least one processor, a number of catastrophe resources needed to handle the number of insurance policies in the geographic region, and assign, by the at least one processor, at least one of the catastrophe resources to each of the insurance policies in the geographic region.

In addition, aspects of this disclosure provide a method that includes receiving, by one or more computing devices, barometric data from each of a plurality of mobile devices, wherein each mobile device comprises one or more sensors, identifying, by the one or more computing devices, that the barometric data indicates an occurrence of at least one catastrophic event, identifying, by the one or more computing devices, a geographic region affected by the at least one catastrophic event, accessing, by the one or more computing devices, an insurance policy database to determine a number of insurance policies in the geographic region, estimating a number of catastrophe resources needed to handle the number of insurance policies in the geographic region, and assigning at least one of the catastrophe resources to each of the insurance policies in the geographic region.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
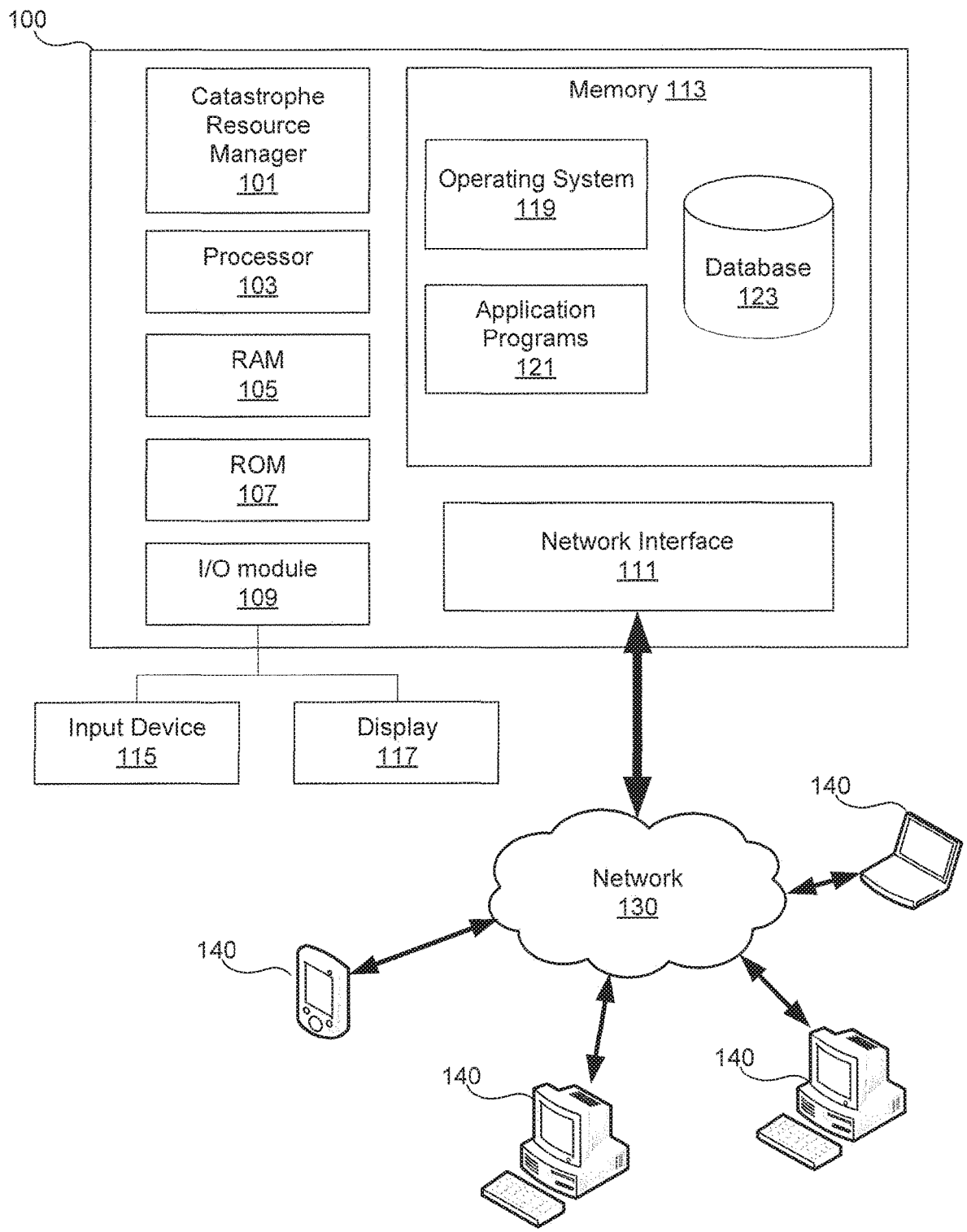
FIG. 1 depicts a block diagram of an example catastrophe resource device that may be used in accordance with one or more example embodiments.

In accordance with various aspects of the disclosure, computerized methods, systems, devices, and apparatuses are disclosed that provide a catastrophe resource system in order to detect natural disasters and other catastrophes using mobile devices of individuals. The catastrophe resource system may utilize data obtained from the mobile devices of individuals in order to identify an area affected by a catastrophe, determine the extent of a catastrophe, efficiently dispatch resources, such as claim adjusters, estimate total loss in the area affected by the catastrophe, and/or prevent fraudulent insurance claims. The system may identify and allocate resources to each catastrophe and/or assign resources to each claim in an affected area. In some embodiments, resources may be allocated to efficiently manage and handle received insurance claims. Resources may be allocated to different areas or catastrophes based on their experience, availability, or other applicable criteria. Resources may include field adjusters or outside adjusters (also referred to as on-site adjusters), damage site evaluators, waiver adjusters, and fast track adjusters. Resources may also include various tools such as ladders, ropes, and other home or automobile adjuster equipment.

In particular, the present disclosure teaches a catastrophe resource system that may be beneficial in providing individuals located in catastrophe-affected geographic regions with resources in an efficient manner. The catastrophe resource system may be integrated across a plurality of platforms and may be employed by an insurance company that handles insurance claims and offers catastrophe resource benefits or services in insured individuals (e.g., insurance policy holders). That is, the insurance company may offer such benefits to individuals who are insurance policy holders with registered accounts, wherein the individual may have opted in for the catastrophe resource service or program.

The catastrophe resource system may offer catastrophe resource services to individuals by determining when catastrophes occur in specific geographic regions by monitoring barometric data. For example, each individual within a geographic area may have a mobile device with a barometer or a barometric sensor that measures atmospheric pressure and/or barometric pressure changes. The barometer may be integrated into the mobile device and may collect real-time data that may be useful for detecting catastrophes, such as hurricanes, tsunamis, tornadoes, wildfires, floods, earthquakes, severe storms, and the like (e.g., changes in atmospheric pressure may indicate a natural disaster is arriving, is occurring, has occurred, etc.). The catastrophe resource system may receive or collect barometric data from each of a plurality of mobile devices, in which each of the mobile devices may be associated with and/or belong to an individual insured by the insurance company. The barometric data may include measurements of atmospheric pressure within a predefined area of each mobile device. That is, the barometer in each mobile device may measure atmospheric pressure within the immediate area (e.g., 5 feet, 10 feet, 100 feet, 1 mile, etc.) that the mobile device is located. This range of detection and sensitivity of each barometer may vary depending on the manufacturer of the sensor, and the barometer may be calibrated accordingly. In addition to barometric data, the catastrophe resource system may also collect other types of data from other sensors in each of the plurality of mobile devices. For example, each of the mobile devices may include at least one of a thermometer, GPS, magnetometer, gyroscope, accelerometer, compass, temperature sensor, infrared sensor, environmental sensor, and the like. In some arrangements, this information may be used with the barometric sensor data to predict catastrophes, dispatch resources, etc.

After collecting the barometric data (and, in some examples, additional environmental data), the catastrophe resource system may identify whether or not the collected barometric data from each of the mobile devices indicates an occurrence of at least one catastrophic event. For example, there may be hundreds or thousands of insured individuals located in a particular geographic region (e.g., city, state, or region of a country), in which each insured individual may have a mobile device with a barometer. The catastrophe resource system may be able to collect the barometric data from each of these mobile devices using the barometers and then compare the barometric data with one or more predefined threshold values for catastrophes. For example, the one or more predefined threshold values may include values, ranges of values, and/or patterns for atmospheric pressure and other indicators or metrics associated with catastrophes. In some embodiments, the catastrophe resource system may derive the predefined threshold values from meteorologists, weather satellites, national weather services, and/or other meteorological organizations. Based on the comparison, the catastrophe resource system may identify whether or not one or more values of the barometric data are below or above the predefined threshold values for catastrophes. That is, the catastrophe resource system may determine whether or not the values of the barometric data are within the ranges of previously reported catastrophic events. If the values of the barometric data are not within the ranges of metrics for catastrophic weather, the catastrophe resource system may determine that the barometric data indicates normal weather conditions in each of the geographic regions and may continue to monitor barometric data from each of the mobile devices in order to detect any changes. If the values of the barometric data are within the ranges of metrics for catastrophic weather, the catastrophe resource system may identify at least one catastrophic event as well as a geographic region affected by the at least one catastrophic event. For example, catastrophic events may include hurricanes, tsunamis, tornadoes, wildfires, floods, earthquakes, severe storms, and the like. The catastrophe resource system may be able to determine the particular type of catastrophe and estimate the severity of the catastrophic event. For example, if the catastrophic event is a tornado, the catastrophe resource system may be able to estimate or measure the tornado intensity based on standards, such as the Fujita-Pearson scale.

Furthermore, there may be multiple catastrophes, each occurring in different regions. The catastrophe resource system may detect if one or more catastrophes have occurred and identify the precise locations of each catastrophe based on the barometric readings collected from each mobile device. In some embodiments, the catastrophe resource system may compile barometric data from the plurality of mobile devices and provide a map that illustrates barometric readings across different geographic regions corresponding to where each mobile device is located. In other words, the catastrophe resource system may be able to visually display and determine the number of insured individuals in different geographic regions based on the collected barometric readings.

The catastrophe resource system may also access an insurance policy database to determine a number of insurance policies in a particular geographic region that has been affected by a catastrophe. The insurance policy database may store information regarding insurance policies, including account information, such as account holder, insured individuals, an insurance policy number, insurance coverage, premiums, deductibles, billing information, payment history, address/location information, and the like. For example, the catastrophe resource system may identify that there are hundreds or thousands of insured individuals or customers in the geographic region based on the information stored in the insurance policy database. After determining a number of insured individuals (e.g., corresponding to a number of insurance policies) in the geographic region, the catastrophe resource system may estimate a number of catastrophe resources needed to handle resulting insurance claims in the geographic region. Catastrophe resources may include coordinators, adjusters (e.g., field adjusters, fast track adjusters, waiver adjusters, and damage site evaluators), processors, managers, administrative personnel, and the like.

In some cases, the catastrophe resource system may be able to estimate the number of catastrophe resources needed by estimating the extent of damage in a geographic region. That is, the catastrophe resource system may estimate the extent of damage in the geographic region based on the magnitude of values in the collected barometric data. For example, the catastrophe resource system may utilize the amount of change in atmospheric pressure as a proxy for an estimate of damage in the geographic region as a result of the catastrophic event. The catastrophe resource system may also correlate different magnitudes of pressure changes to different damage levels based on the type of catastrophic event. For example, a hail storm may result in different damages (e.g., lesser in severity) then the damages resulting from a tornado or hurricane. Therefore, a catastrophe resulting in severe damages may necessitate a greater number of resources, such as claim adjusters, to be sent to the geographic region in order to verify damage to properties and to assist customers or individuals in processing their insurance claims. Thus, the catastrophe resource system may take into account these different damage levels derived from the collected barometric data in order to estimate the amount and/or types of catastrophe resources needed in the geographic region. Finally, in some examples, the catastrophe resource system may assign at least one catastrophe resource to each of the insurance policies in the geographic region.

In some embodiments, the catastrophe resource system may be able to collect barometric data and predict a particular catastrophe even before it occurs. For example, the atmospheric pressure may gradually change before a storm hits a particular area; the catastrophe resource system may be able to detect these changes, identify a pattern or route of a storm, and predict which geographic region will be hit next by the storm based on the identified pattern or route. By predicting the geographic region that is vulnerable to a moving storm, the catastrophe resource system may be able to assign catastrophe resources to the geographic region before disaster strikes, ultimately allowing the insurance company to plan ahead to reach disaster areas in a timely manner.

In some embodiments, the catastrophe resource system may also be able to detect cases of fraud in which individuals attempt to obtain insurance claim coverage for damages not covered by the insurance company. For example, an individual may have hail damage on his or her rooftop which resulted from a hail storm that occurred before the individual signed up for insurance with the insurance company. In other cases, an individual may have damages in his house which did not result from a catastrophe covered by the insurance company. For example, a semi-truck may have run into the individual's house, resulting in damages that appear similar to damages resulting from a tornado. Individuals may attempt to obtain coverage for such damages by filing insurance claims with the insurance company. The catastrophe resource system may be able to identify whether or not an individual's insurance claim is valid by checking insurance records, as well as checking barometric data readings in the same geographic region as the individual. That is, the catastrophe resource system may be able to verify the individual's insurance claim by comparing the individual's barometric data with barometric data from other individuals in the same geographic region.

If the individual's barometric data readings match with the other readings, the catastrophe resource system may verify that the insurance claim is valid and may cover the damages. If the individual's barometric data readings do not match with the other readings, the catastrophe resource system may determine that the insurance claim might be invalid. The catastrophe resource system may earmark the particular insurance claim as possibly being fraudulent, the catastrophe resource system may implement additional insurance claim processing of the claim. That is, the catastrophe resource system may send out a claim adjuster to examine a property and determine whether or not the claim is fraudulent. This fraud-detecting feature of the catastrophe resource system may allow the insurance company to prevent customers from taking advantage of catastrophe resource services and to provide resources to insured individuals who may need urgent assistance in processing their claims.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example catastrophe resource device 100 that may be used in accordance with aspects of the present disclosure. The catastrophe resource device 100 may be a specialized computing device programmed and/or configured to perform and carry out aspects associated with requesting catastrophe resources and/or providing catastrophe resource servers to insured individuals as described herein. The catastrophe resource device 100 may have a catastrophe resource manager 101 configured to perform methods and execute instructions as described herein. The catastrophe resource manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the catastrophe resource manager 101 may refer to the software (e.g., a computer program or application) and/or hardware used to collect barometric data from mobile device sensors, identify catastrophic event(s) based on collected barometric data, identify geographic region(s) affected by catastrophic event(s), determine insurance policies in the geographic region(s), estimate catastrophe resources needed in each geographic region, and assign catastrophe resources to each of the insurance policies in each geographic region. Specifically, the catastrophe resource manager 101 may be a part of a catastrophe resource system that detects catastrophes based on collected data from mobile devices and facilitates the insurance claims process for insured individuals by assigning resources to catastrophe-affected areas. The one or more specially configured processors of the catastrophe resource manager 101 may operate in addition to or in conjunction with another general processor 103 of the catastrophe resource device 100. In some embodiments, the catastrophe resource manager 101 may be a software module executed by one or more general processors 103. Both the catastrophe resource manager 101 and the general processor 103 may be capable of controlling operations of the catastrophe resource device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or insured individual associated with the catastrophe resource device 100 may provide input data. For example, the input device 115 may also include one or more sensors associated with the catastrophe resource device 100, including a barometer, thermometer, GPS, magnetometer, gyroscope, accelerometer, compass, temperature sensor, infrared sensor, environmental sensor, and the like. The I/O module 109 may be configured to be connected to a display device 117, such as a monitor, television, touchscreen, and the like, and may include a graphics card. The display device 117 and input device 115 are shown as separate elements from the catastrophe resource device 100, however, they may be within the same structure.

Using the input device 115, system administrators may update various aspects of the catastrophe resource system, such as rules, predefined threshold values/ranges, or information related to identifying whether or not collected barometric data indicates an occurrence of a catastrophic event and identifying geographic regions affected by the catastrophic event. For example, system administrators may update values of one or more weather metrics (e.g., atmospheric pressure, temperatures, wind patterns, etc.) associated with different catastrophes in order to distinguish between normal weather conditions and catastrophe-related weather conditions. Based on these set values of the one or more weather metrics, the catastrophe resource system may be able to detect catastrophes before, during, or after an occurrence. System administrators may also use the input device 115 to update rules or information related to the catastrophe resource system estimating a number of catastrophe resources needed to handle resulting insurance claims and/or insurance policies in a catastrophe-affected geographic region. On some catastrophe resource devices 100, the input device 115 may be operated by users (e.g., individuals insured by an insurance company and/or signed up for catastrophe resource services/benefits) to interact with the catastrophe resource system 100, including submitting or receiving information regarding insurance claims, requesting coverage of damages after catastrophes, receiving or providing information regarding settlements, providing or updating preferences for catastrophe resource services, sending contact information to catastrophe resources (e.g., claim adjusters), updating account information, and the like, as described herein.

The memory 113 may be any computer readable medium for storing computer executable instructions (e.g., software). The instructions stored within memory 113 may enable the catastrophe resource device 100 to perform various functions. For example, memory 113 may store software used by the catastrophe resource device 100, such as an operating system 119 and application programs 121, and may include an associated database 123.

The network interface 111 allows the catastrophe resource device 100 to connect to and communicate with a network 130. The network 130 may be any type of network, including a local area network (LAN) and/or a wide area network (WAN), such as the Internet. Through the network 130, the catastrophe resource device 100 may communicate with one or more computing devices 140, such as laptops, notebooks, smartphones, personal computers, servers, and the like. The computing devices 140 may include at least some of the same components as catastrophe resource device 100. In some embodiments the catastrophe resource device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface 111 may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a catastrophe resource device 100. In other embodiments, the catastrophe resource device 100 may include fewer or more elements. For example, the catastrophe resource device 100 may use the general processor(s) 103 to perform functions of the catastrophe resource manager 101, and thus, might not include a separate processor or hardware for the catastrophe resource manager 101. Additionally, or alternatively, the catastrophe resource device 100 may be a mobile device (e.g., a smartphone, tablet, and the like) specially configured to perform or carry out aspects of catastrophe resource services described herein, and thus, may also include various other components, such as a battery, speaker, and/or antennas (not shown).

Figure 2:
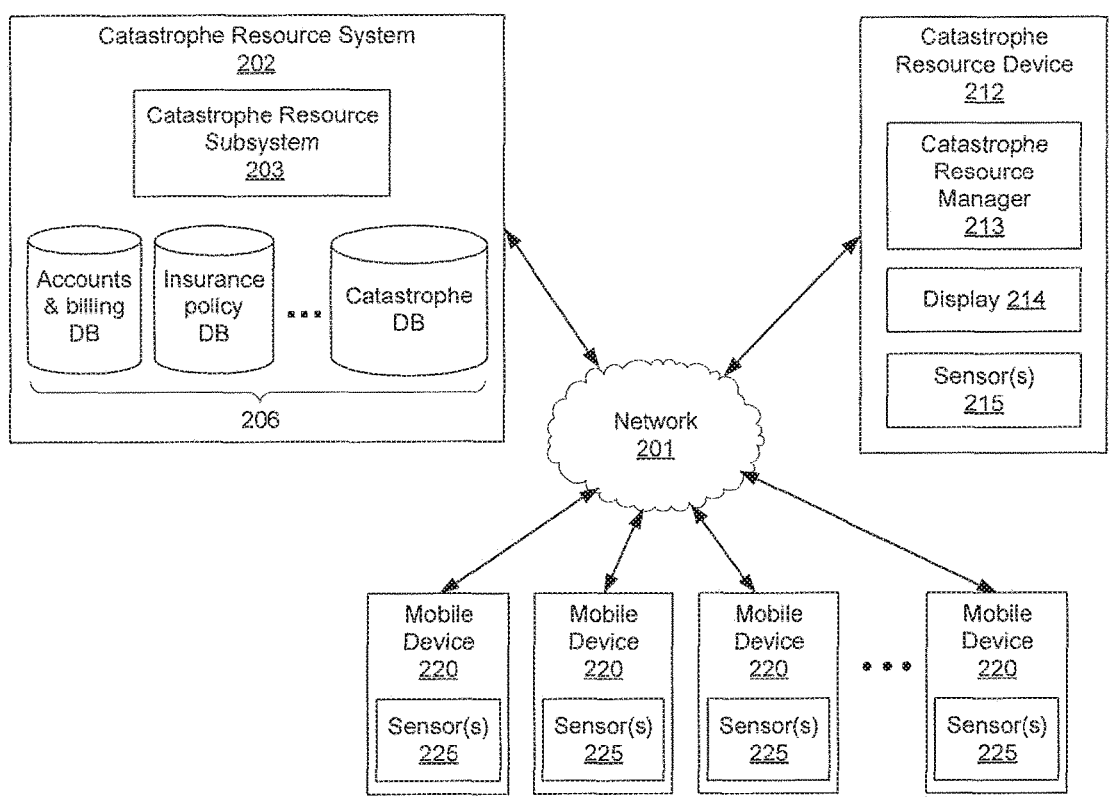
FIG. 2 depicts an example network environment in which various aspects of the present disclosure may be implemented in accordance with one or more example embodiments.

The computerized methods for providing catastrophe resource features of detecting catastrophes and assigning catastrophe resources to insured individuals in different geographic regions as disclosed herein may be implemented on one or more catastrophe resource devices 100 used in various network environments. FIG. 2 illustrates an example network environment for implementing methods in accordance with aspects of the present disclosure.

As shown in FIG. 2, the network environment 200 may include a network 201 configured to connect a catastrophe resource system 202, catastrophe resource device 212, and a plurality of mobile device 220. The catastrophe resource device 212 may be the same as or at least similar to the catastrophe resource device 100 described above with reference to FIG. 1. Collectively, these specialized computing devices may form at least a part of a catastrophe resource system. It is understood that there may be any number of components 212 and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers.

Accordingly, for example, a mobile device 220 (e.g., a smartphone, flip-phone, tablet, and the like) or a catastrophe resource device 212 of an insured individual may communicate, via a cellular backhaul of the network 201, with a catastrophe resource system 202 to request a resource, such as a claims adjuster, as a part of the catastrophe resource service. In another example, the mobile device 220 or the catastrophe resource device 212 of the insured individual (or accessed by the insured individual) may communicate, via the cellular backhaul of the network 201, with the catastrophe resource system 202 to submit information regarding an insurance claim or to update account information and/or preferences for the catastrophe resource service. And in the opposite direction, the catastrophe resource system 202 may communicate, via the cellular backhaul of the network 201, with the mobile device 220 or the catastrophe resource device 212 to notify the individual associated with the mobile device 220 or catastrophe resource device 212 of a detected catastrophic event, estimated damage resulting from the catastrophic event, and/or an assigned catastrophe resource to handle one or more insurance claims of the individual. In another embodiment, the mobile device 220 and/or catastrophe resource device 212 may communicate back and forth with the catastrophe resource system 202 over the Internet, such as through a web portal.

In some embodiments, insurance companies may provide insurance policies to individuals and businesses to cover loss or damage of property. In return, a customer may remit payments to the insurance companies. These payments may be done on a scheduled basis, such as monthly or yearly. The insurance policies may be specific and only cover loss or damage to the property from certain types of occurrences. Alternatively, insurance policies may be broad and cover loss or damage to the property from many different occurrences. There may be multiple properties that are covered by an insurance policy. Types of insurance policies may include vehicle insurance (including personal automobile, motorcycle, boat, and various commercial lines, etc.), homeowner insurance, renters insurance, commercial property insurance, and the like. As described herein, an insured individual or a customer may include any party that may report a loss to the insurance company, including, but not limited to, an insured party, third-party claimant, insurance agent, attorney, or public adjuster.

When loss or damage occurs to an insured property, the customer may contact the insurance company to report the loss or damage and make a claim against their policy in order to obtain compensation for the loss or damage. Resources within or external to the insurance company may handle the insurance claim and determine the amount, if any, of compensation due to the customer. In some cases, insurance companies may provide insurance to a plurality of individuals and businesses within a geographic region.

FIG. 2 illustrates a plurality of mobile devices 220, in which each mobile device is associated with (e.g., belongs to) an insured individual or customer of the insurance company. The insured individual may be enrolled in a service that allows the individual to benefit from the catastrophe resource service. In some cases, there may be hundreds or thousands of insured individuals located in a particular city, state or region of a country, in which each insured individual may have a mobile device 220. Each mobile device 220 may also have one or more sensors 225, in which the one or more sensors 225 may include a barometer or a barometric sensor that measures atmospheric pressure and/or barometric pressure changes. In some embodiments, the one or more sensors 225 may include various sensors and/or modules, including a barometer, thermometer, GPS, magnetometer, gyroscope, accelerometer, compass, temperature sensor, infrared sensor, environmental sensor, and the like. The one or more sensors 225 (e.g., the barometer) may be integrated into each mobile device 220 and may collect real-time data that may be useful for detecting catastrophes, such as hurricanes, tsunamis, tornadoes, wildfires, floods, earthquakes, severe storms, and the like. The catastrophe resource system 202 may be configured to communicate with the plurality of mobile devices 220 simultaneously (e.g., at or around the same time). The catastrophe resource system 202 may receive and/or collect barometric data for each of the plurality of mobile devices 220 (e.g., from the sensors 225) simultaneously, identify one or more catastrophic events within predefined areas of each mobile device 220 simultaneously, identify geographic regions affected by the catastrophic event(s) simultaneously, determine insurance policies in each geographic region simultaneously, estimate catastrophe resources needed in each geographic region simultaneously, assign catastrophe resources to insurance policies in each geographic region simultaneously, and send notifications regarding catastrophe resource assignments to each of the plurality of mobile devices 220 simultaneously.

In some embodiments, an insured individual or customer may operate a catastrophe resource device 212. In some embodiments, both a catastrophe resource device 212 and a mobile device 220 may be employed, whereas in other embodiments, only one of these devices may be used by individuals enrolled in the catastrophe resource service. In some embodiments, the catastrophe resource device 212 may be a specialized mobile device (e.g., mobile phone), a tablet, laptop, personal computer, and the like configured to perform or carry out aspects associated with catastrophe resource services described herein. For example, the catastrophe resource device 212 may be the same as the mobile device 220 depicted in FIG. 2. The catastrophe resource device 212 may belong to an individual or customer of an insurance company who is an insurance policy holder and/or enrolled in a catastrophe resource service. Although only one catastrophe resource device 212 is illustrated in FIG. 2, there may be any number of catastrophe resource devices 212, wherein each catastrophe resource device 212 is associated with at least one insured individual. The catastrophe resource device 212 may further comprise a catastrophe resource manager 213, a display 214, and sensors 215.

The catastrophe resource device 212 may be configured to execute the catastrophe resource manager 213 that presents a user interface (e.g., a graphical user interface for a website, application, software program, and the like) on the display 214. The display 214 may comprise a monitor, television, touchscreen, and the like. The user interface of the catastrophe resource manager 213 may allow individuals to send and/or receive data regarding insurance claims, damages, compensation, settlement offers, catastrophe resources, and the like. The user interface may also allow individuals to receive notifications regarding catastrophe resource assignments and to update account information or preferences for the catastrophe resource services provided by the catastrophe resource system 202.

The catastrophe resource manager 213 may be a self-sufficient program or may be a module of another program, such as a program used to collect information utilized by the catastrophe resource system 202. The catastrophe resource manager 213 may have access to data (e.g., barometric data) that is collected by the sensors 215 of the catastrophe resource device 212. The catastrophe resource manager 213 may be configured in a similar manner as the catastrophe resource manager 101 or configured to perform similar functions as those performed by the catastrophe resource manager 101. The sensors 215 may comprise various sensors and/or modules, including a barometer, thermometer, GPS, magnetometer, gyroscope, accelerometer, compass, temperature sensor, infrared sensor, environmental sensor, and the like. In some embodiments, the sensors 215 may detect weather-related factors that may result in a catastrophic event, such as a hurricane, tornado, tsunami, and the like. The catastrophe resource manager 213 may also have access to data that is collected by the sensors 215 of the catastrophe resource device 212. For example, the sensors 215 may include a barometer that measures atmospheric pressure within a predefined area of the catastrophe resource device 212. One or more of the sensors 215 may be used to monitor various weather metrics to detect changes in weather conditions, predict potential catastrophes, and/or estimate potential levels of damage resulting from a catastrophe.

In some embodiments, the catastrophe resource manager 213 may be downloaded or otherwise installed onto the catastrophe resource device 212 using known methods. Different devices may install different versions of the catastrophe resource manager 213 depending on their platform. For example, a catastrophe resource device 212 (e.g., a smartphone) running a first operating system may download a different version of the catastrophe resource manager 213 than a catastrophe resource device 212 running a second operating system, different from the first operating system.

An individual or user may launch the catastrophe resource manager 213 by, for example, operating buttons or a touchscreen on the catastrophe resource device 212. Additionally, or alternatively, the catastrophe resource device 212 may be configured to execute a web browser (e.g., an application for accessing and navigating the Internet) to access a web page providing an interface for the catastrophe resource system. In some embodiments, the catastrophe resource device 212 may also be configured to collect information, such as barometric data. For example, the catastrophe resource manager 213 or another program installed on the catastrophe resource device 212 may instruct the catastrophe resource device 212 to collect data using the various sensors 215 (e.g., barometer, thermometer, GPS, magnetometer, gyroscope, accelerometer, compass, temperature sensor, infrared sensor, environmental sensor, and the like). This data may include barometric data and/or any other data that is indicative of the values of one or more weather metrics associated with catastrophes. In some embodiments, the catastrophe resource manager 213 may determine relevant weather metrics to monitor and/or collect data based on standards set by national weather services, meteorologists, weather satellites, and/or other meteorological organizations.

The catastrophe resource manager 213 or another program installed on the catastrophe resource device 212 may collect weather-related data (e.g., barometric data obtained from sensors 215) in real-time, automatically, or over a predetermined period of time. For example, the catastrophe resource manager 213 may be configured to collect barometric data (e.g., atmospheric pressure measurements) once per second, once per minute, once every five minutes, or the like. In another example, the catastrophe resource manager 213 may be configured to collect data after a state of emergency has been declared or after a national weather service has issued a warning regarding catastrophic weather. In some embodiments, the sensors 215 may be obtaining measurements in real-time (or near real-time), whereas the catastrophe resource manager 213 may be configured to collect data points that are relevant to catastrophic events. That is, the catastrophe resource manager 213 may collect barometric data (obtained from the sensors 215) when the atmospheric pressure changes by a certain amount over a certain period of time. For example, if the atmospheric pressure changes by tens, hundreds, or thousands of millibars (or by another unit of pressure) within a span of minutes (e.g., within 2 minutes, 5 minutes, 10 minutes, and the like), then the catastrophe resource manager 213 may collect the data points indicating the pressure changes. The catastrophe resource manager 213 or another program may also collect location information, such as GPS coordinates indicating the geographical location of the catastrophe resource device 212 and/or mobile device 220.

Once the data has been collected, the catastrophe resource manager 213 may be configured to send the collected data to the catastrophe resource system 202 instantaneously, automatically, or at a later time. For example, the catastrophe resource manager 213 may provide all collected data or merely data that is indicative of a catastrophic event to the catastrophe resource system 202. The catastrophe resource manager 213 may send this data after a catastrophe has occurred or throughout the duration of a catastrophic event.

For example, the catastrophe resource manager 213 may collect barometric data during the duration of a storm, cache the collected data (e.g., in memory stored in the device 100), and transmit the collected data to the catastrophe resource system 202 after the storm is over. The catastrophe resource manager 213 may be able to detect that a storm is over by analyzing the collected barometric data. If the barometric measurements have returned to values indicative of normal weather conditions, then the catastrophe resource manager 213 may determine that the storm is over. By collecting data and sending the collected data after a catastrophic event, the catastrophe resource manager 213 may allow individuals to conserve battery life of their devices (e.g., catastrophe resource device 212 or mobile device 220) during catastrophes and/or emergency situations.

FIG. 2 also illustrates example subsystems within the network environment 200. That is the catastrophe resource system 202 may comprise a catastrophe resource subsystem 203 and a plurality of databases 206. The catastrophe resource subsystem 203 may include one or more application servers, computing devices, and other equipment (e.g., conference bridge equipment) used by company (e.g., insurance company) personnel to implement and provide the catastrophe resource services described herein. For example, the catastrophe resource subsystem 203 may include a catastrophe resource assignment module that is configured with programmed instructions to identify catastrophic events based on collected barometric data from each of the plurality of mobile devices 220, identify geographic region(s) affected by the catastrophic events, determine insurance policies in each geographic region, estimate catastrophe resources needed to handle the number of insurance policies in each geographic region, assign at least one catastrophe resource to each of the insurance policies in each geographic region, and notify each individual of a respective catastrophe resource assignment by sending a notification to each of the plurality of mobile devices 220.

For example, the catastrophe resource assignment module may identify a catastrophic event based on comparing the barometric data with one or more predefined threshold values for catastrophes. The one or more predefined threshold values may include values, ranges of values, and/or patterns for atmospheric pressure and other indicators or metrics associated with catastrophes. The catastrophe resource assignment module may access these predefined threshold values for catastrophe-related metrics which may be stored in one or more databases (such as databases 206). The catastrophe resource assignment module may be able to identify a catastrophic event by parsing threshold values stored in one or more databases 206 and identifying that at least one value of the barometric data matches a threshold value indicating a catastrophic event. In some cases, the catastrophe resource assignment module may identify that at least one value of the barometric data is below or above a predefined threshold value for catastrophes. For example, the predefined threshold values may indicate normal weather conditions when within a certain range; however, if the barometric value is above or below a certain value (e.g., outside of a certain range), then the barometric data indicates that a particular catastrophic event has occurred.

After identifying the catastrophic event, the catastrophic resource assignment module may identify one or more geographic regions affected by the catastrophic event and determine a number of insurance policies in each geographic region by accessing an insurance policy database (e.g., database 206). For example, the catastrophe resource assignment module may identify that there are a certain number of insured individuals or customers in the geographic region based on parsing the information stored in the insurance policy database (e.g., by searching for insurance policies in a specific location or geographic region). The catastrophe resource assignment module may then estimate a number of catastrophe resources needed to handle the number of insurance policies in the geographic region and assign at least one of the catastrophe resources to each of the insurance policies in the geographic region. That is, the catastrophe resource assignment module may estimate resources needed by accessing previous catastrophe records (e.g., in a database 206) to determine resources needed for previous catastrophes with similar barometric readings, estimating a level of damage based on the barometric data (e.g., based on the magnitude of barometric pressure readings and the rate of pressure changes), and/or determining resources needed to handle a certain damage level in the geographic region. In order to assign catastrophe resources to insurance policies, the catastrophe resource assignment module may associate at least one catastrophe resource assignment with each insurance policy by identifying an account number (e.g., insurance policy number) or another unique identifier for each insurance policy. The catastrophe resource assignment module may then store the catastrophe resource assignment for each insurance policy as one or more records (e.g., insurance policy records) in a database, such as an insurance policy database (e.g., database 206), of the catastrophe resource system 202. For example, the one or more records may identify a unique identification number for the insurance policy holder (e.g., the insured individual). In another example, the one or more records may include at least one field for the one or more catastrophe resource assignments for each insurance policy. The catastrophe resource assignment module may update one or more catastrophe resource assignments by inserting one or more identifiers in the fields of the one or more records. For example, the catastrophe resource assignments may include resource names and/or contact information of coordinators, adjusters (e.g., field adjusters, fast track adjusters, waiver adjusters, and damage site evaluators), processors, managers, administrative personnel, and the like.

The catastrophe resource subsystem 203 may include functionality that may be distributed among a plurality of computing devices. For example, the catastrophe resource subsystem 203 may comprise further subsystems, including client-side subsystems and server-side subsystems. The client-side subsystem may interface with the catastrophe resource device 212 and/or the plurality of mobile devices 220, whereas the server-side subsystem may interface with application servers and computing devices which handle a variety of tasks related to the identification of catastrophic events and catastrophe-affected geographic regions, estimation of catastrophe resources to handle resulting insurance claims for insured individuals, assignment of catastrophe resources to each insurance policy corresponding to an insured individual in geographic regions, and overall management of catastrophe resource services.

The subsystems, application servers, and computing devices of the catastrophe resource subsystem 203 may also have access to the plurality of databases 206. In some embodiments, the plurality of databases 206 may be incorporated into the catastrophe resource subsystem 203 or may be separate components in the catastrophe resource subsystem 203. The plurality of databases 206 may contain information belonging to or maintained by an insurance company, government entity, and/or third-party. For privacy protection reasons, access to the information in these databases 206 may be restricted to only authorized computing devices and for only permissible purposes. For example, a database 206 may comprise a computer internal to an insurance company that contains customer policy information. A database 206 may also contain policy information about an individual, including but not limited to, the individual's relevant coverage limits/deductibles with insurance carriers, the individual's address information and other personal information, and any other information apparent to one skilled in the art.

As an example, the plurality of databases 206 may comprise an accounts and billing database, an insurance policy database, a catastrophe database, and other databases. For example, the insurance policy database may store insurance information regarding insurance policies of insured individuals, such as data regarding an account holder, insured individuals, an insurance policy number, insurance coverage, premiums, deductibles, billing information, payment history, address/location information, and the like. The catastrophe database may include information regarding previous catastrophes in various geographic regions, barometric data corresponding to the previous catastrophes, previous catastrophe resource assignments, predefined values for data indicative of different catastrophes, and the like. The data stored in the plurality of databases 206 may be collected and compiled by the catastrophe resource device 212, the catastrophe resource subsystem 203, or by servers and subsystems within the catastrophe resource subsystem 203.

In another example, one or more databases 206 may also include predefined business rules and other information to enable the methods disclosed herein. For example, one or more databases 206 may contain historical claim data, or other applicable data archived by the insurance company. This data may be used, among other things, to optimize the business rules and/or claim segmentation techniques used in the method and systems disclosed herein.

Furthermore, one or more databases 206 may represent an external computer with a large memory store, and run a system, such as a scheduling system, for enabling the assignment of particular resources for adjustment of a customer's claim. The one or more databases 206 may contain information about the availability of various resources such as adjusters and other performers available to an insurance company for processing a claim. In addition, one or more databases 206 may provide access to factors corresponding to the catastrophic event, such as wind speed data collected from a third-party vendor/software.

In some cases, an insurance company may offer catastrophe resource services to customers or insured individuals as an optional service. For example, individuals may sign up or opt for a catastrophe resource service and may pay fees, in some arrangements additional to their insurance premium fees, for the service. In other embodiments, the catastrophe resource service (as implemented by the catastrophe resource system 202) may be an additional feature in a customer's insurance plan. As an additional feature, individuals who sign up or opt for the catastrophe resource service may receive different incentives, such as discounts on insurance premiums and prioritized claims processing. For example, if an individual agrees to allow the catastrophe resource system to collect barometric data from his or her mobile device, then the individual may receive a certain percentage discount (e.g., 2%, 4%, 10%, or another percentage) off insurance premium costs, a deductible, or the like. In some embodiments, the insurance company may provide monetary rewards or discounts, such as $100 cash back for participating in catastrophe resource services.

Additionally, the insurance company may also provide customers with prioritized claims processing, in which individuals who allow the catastrophe resource system to collect barometric data are provided with a priority in insurance claim processing when a catastrophe hits. For example, a first individual who has opted for the catastrophe resource service may receive insurance claim processing before a second individual who has not signed up for the catastrophe resource service. The catastrophe resource system may also offer customers additional features such as an advance partial settlement feature, in which customers are provided payment in advance to over damages for insured property. This partial settlement feature may allow customers to use this money during emergency situations, such as after a devastating catastrophe.

The catastrophe resource system may provide partial settlements to insured individuals based on barometric data collected from mobile devices. For example, the catastrophe resource system may detect a certain degree of change in the barometric data obtained from an insured individual's mobile device. Based on this degree of change, the catastrophe resource system may estimate a degree of damage to an insured individual's property. For example, the catastrophe resource system may access an insurance policy database and determine that the insured individual will most likely submit an insurance claim for his or her insured property which is insured for a certain amount. Based on the estimated degree of damage to the insured property and the amount for which the property is insured, the catastrophe resource system may identify a claim adjustment and determine/offer a partial settlement to pay the insured individual to cover the estimated damages to the insured property. The catastrophe resource system may provide the partial settlement to the customer in advance, so that the customer may use the money to pay for a place to stay temporarily after a catastrophe, such as after a tornado has destroyed the customer's house.

Using similar techniques, the catastrophe resource system may also be able to estimate total loss in one or more geographic regions and estimate resources needed to adjust claims in the one or more geographic regions. Furthermore, customers may provide information to the catastrophe resource system in order to assist in the insurance claim process and/or the catastrophe resource deployment.

As an additional feature, the catastrophe resource system may use real-time weather data (e.g., atmospheric pressure readings, wind speeds, temperatures, and the like) to determine the severity or a size of a catastrophic event in different geographic regions (e.g., rural areas, metropolitan areas, and the like). The catastrophe resource system may also provide weather-related warnings and messages to customers (e.g., notifications alerting customer to bring an umbrella or to reschedule an outdoor event due to stormy weather). The catastrophe resource system may incorporate social media and/or develop historical patterns using a larger sample of data points available from weather organizations and/or other available industries.

Figure 3:
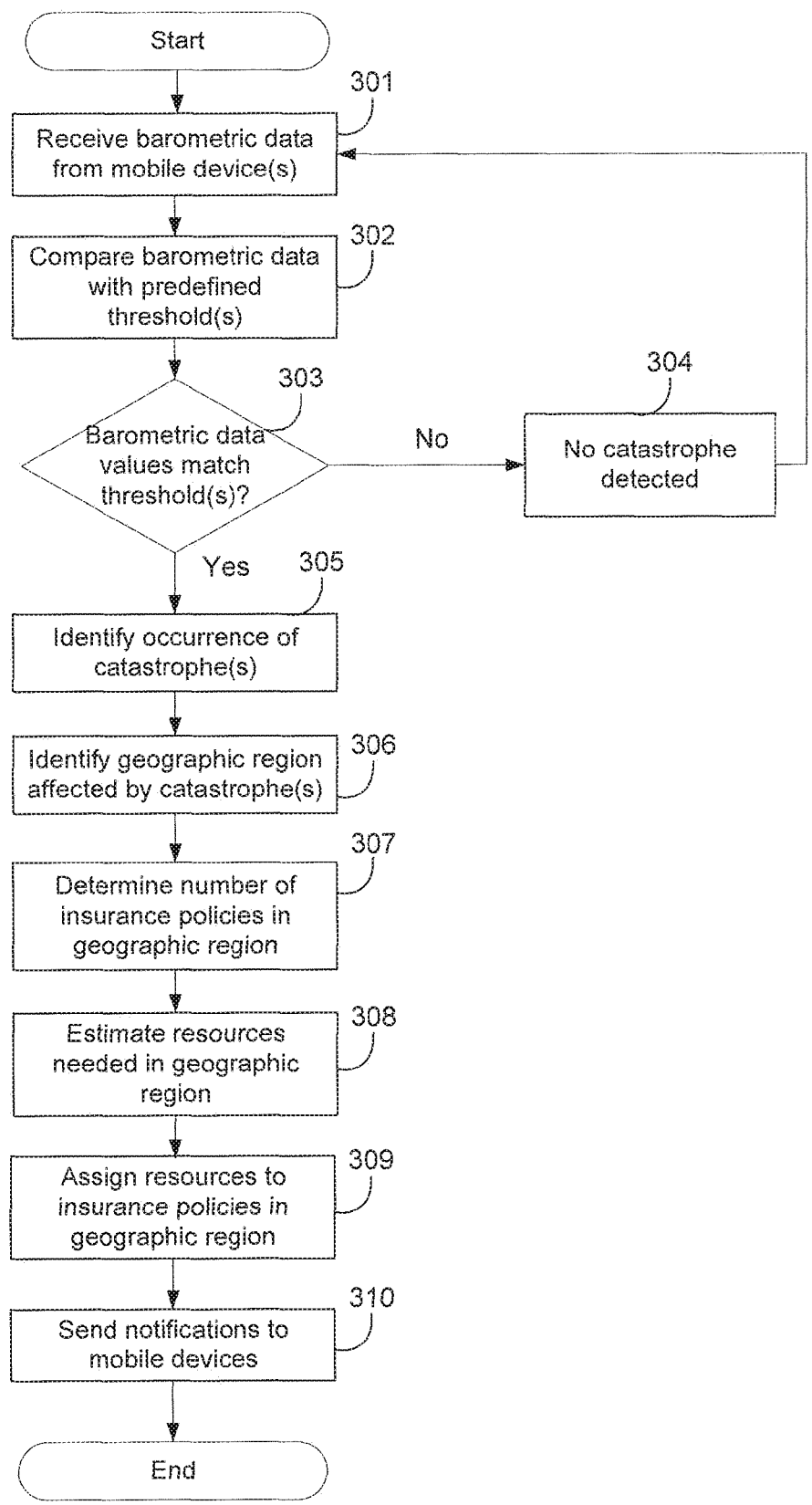
FIG. 3 depicts a flow diagram of example method steps for providing catastrophe resource services to insured individuals in accordance with one or more example embodiments.

FIG. 3 illustrates a flow diagram of an example method in accordance with aspects of the present disclosure. In particular, FIG. 3 illustrates example method steps for identifying catastrophes and providing catastrophe resources to insured individuals. The steps of FIG. 3 may be performed by subsystems, application servers, and computing devices of the catastrophe resource system 202 (e.g., catastrophe resource subsystem 203). One or more of the steps of FIG.

3 may be performed by executing a catastrophe resource program (e.g., a catastrophe resource mobile application) and/or by operating a particularly configured computing device of the catastrophe resource system 202. As a result of the method of FIG. 3, the catastrophe resource system 202 may assign at least one catastrophe resource to each insurance policy (corresponding to an insured individual) in one or more catastrophe-affected geographic regions. The catastrophe resource system 202 may also notify a plurality of mobile devices 220 of the catastrophe resource assignments, wherein each mobile device may be associated with an individual insured by an insurance company.

The method of FIG. 3 may begin with step 301, at which the catastrophe resource system may receive barometric data. For example, the catastrophe resource system 202 may receive and/or collect barometric data from the plurality of mobile devices 220. In some cases, the catastrophe resource system 202 may collect barometric data from the one or more sensors 225 (e.g., including a barometer), which may be integrated in each of the plurality of mobile devices 220. At step 302, the catastrophe resource system 202 may compare the collected barometric data with one or more predefined threshold values. For example, the catastrophe resource system 202 may compare values from the barometric data with values, ranges of values, and/or patterns for atmospheric pressure and other indicators or metrics associated with catastrophes. In some cases, the catastrophe resource system 202 may access a catastrophe database (e.g., database 206) to compare collected barometric data with recent barometric data values from previous catastrophes. Based on the comparison, at step 303, the catastrophe resource system 202 may identify if the collected barometric data values match or are within the predefined thresholds that are indicative of a catastrophe. If the barometric data values do not match the predefined thresholds, then the method in this example proceeds to step 304.

At step 304, the catastrophe resource system 202 may determine that no catastrophic event has been detected based on the mismatch of barometric data values and the predefined thresholds (303:NO). From step 304, the method may return to step 301, at which the catastrophe resource system 202 may continue to collect barometric data from the plurality of mobile devices 220 and proceed through the rest of the steps as described herein. Referring back to step 303, if the catastrophe resource system 202 identifies that the barometric data values match or are within at least one of the predefined thresholds indicative of a catastrophe, then the method in this example proceeds to step 305. At step 305, the catastrophe resource system 202 may identify an occurrence of at least one catastrophic event. For example, the catastrophe resource system 202 may determine that at least one catastrophic event, such as a hurricane, tsunami, tornado, wildfire, flood, earthquake, severe storm, or the like, has occurred or will occur in the near future. At step 306, the catastrophe resource system 202 may identify at least one geographic region affected by the at least one catastrophic event. For example, the catastrophe resource system 202 may utilize GPS information obtained from the plurality of mobile devices 220 (e.g., along with the barometric data collected in step 301) to determine one or more geographic regions that have been affected by the catastrophe.

At step 307, the catastrophe resource system 202 may determine a number of insurance policies in the one or more geographic regions affected by the catastrophe. For example, the catastrophe resource system 202 may access an insurance policy database (e.g., database 206) to determine the number of insurance policies in particular catastrophe-affected regions. In some embodiments, the catastrophe resource system 202 may compile barometric data from the plurality of mobile devices 220 and generate a map that illustrates barometric readings across different geographic regions corresponding to where each mobile device 220 is located. Based on the map, the catastrophe resource system 202 may determine the number of insured individuals in the different geographic regions. At step 308, the catastrophe resource system 202 may estimate catastrophe resources needed in each geographic region. For example, the catastrophe resource system 202 may estimate a number of coordinators, field adjusters, fast track adjusters, waiver adjusters, damage site evaluators, processors, managers, administrative personnel, and the like, needed to handle the number of insurance policies in each geographic region. At step 309, the catastrophe resource system 202 may assign resources to insurance policies in each geographic region. For example, the catastrophe resource system 202 may assign at least one catastrophe resource to each of the insurance policies in each geographic region based on the type of catastrophe and the estimated severity of the catastrophic event. After assigning the resources, at step 301, the catastrophe resource system 202 may send notifications to each of the plurality of mobile devices 220. For example, the catastrophe resource system 202 may send a notification regarding the catastrophe resource assignment to each of the plurality of mobile devices 220.

Figure 4:
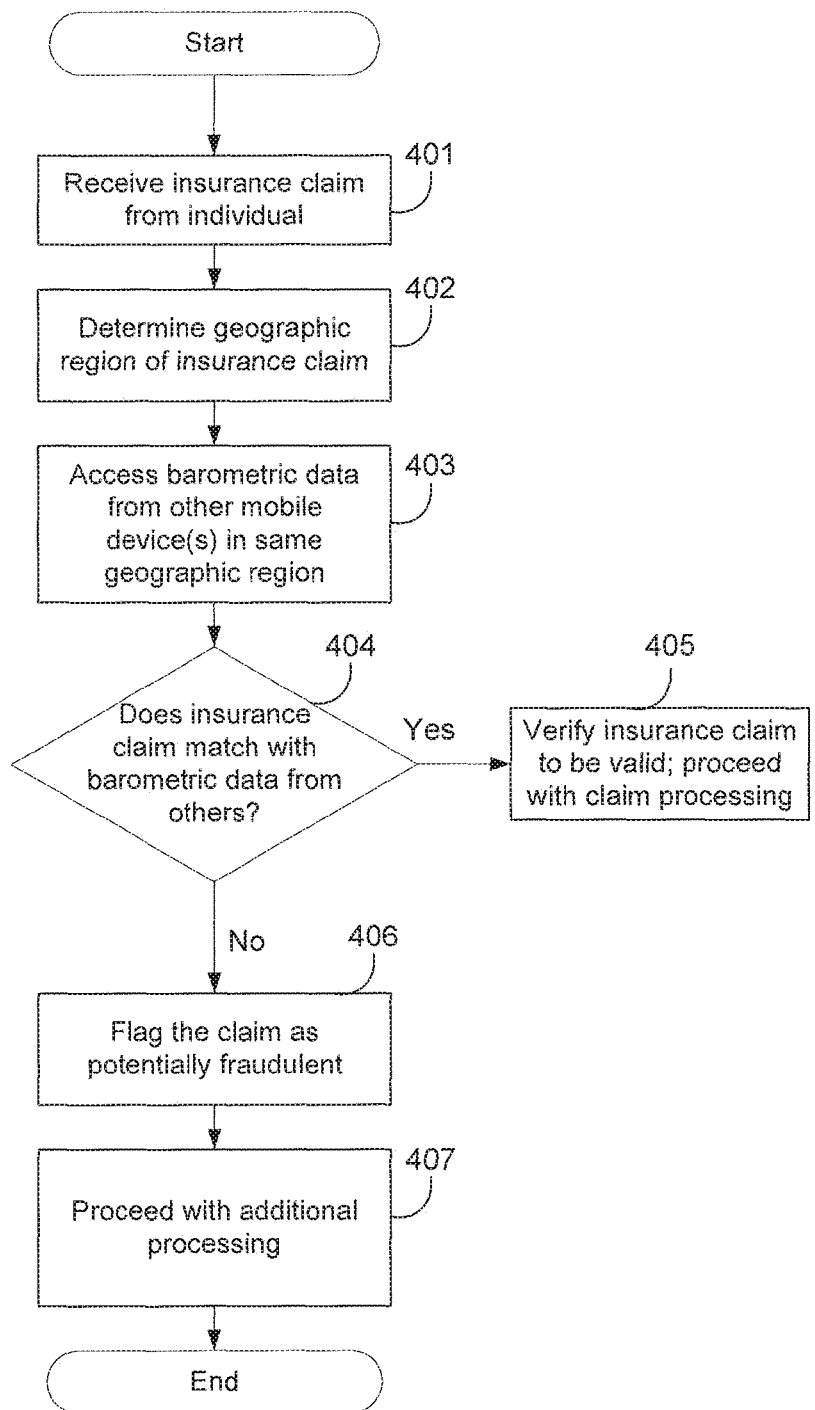
FIG. 4 depicts a flow diagram of example method steps for providing catastrophe resources services to insured individuals in accordance with one or more example embodiments.

FIG. 4 illustrates a flow diagram of an example method in accordance with aspects of the present disclosure. In particular, FIG. 4 illustrates example method steps for identifying fraud in catastrophe resource services provided to insured individuals. The steps of FIG. 4 may be performed by subsystems, application servers, and computing devices of the catastrophe resource system 202 (e.g., catastrophe resource subsystem 203). One or more of the steps of FIG. 4 may be performed by executing a catastrophe resource program (e.g., a catastrophe resource mobile application) and/or by operating a particularly configured computing device of the catastrophe resource system 202. As a result of the method of FIG. 4, the catastrophe resource system 202 may identify fraudulent insurance claims from insurance customers by using barometric data to confirm authenticity of a claim.

The method of FIG. 4 may begin with step 401, at which the catastrophe resource system 202 may receive an insurance claim from an individual. For example, the catastrophe resource system 202 may receive an insurance claim from one of the plurality of mobile devices 220. In some embodiments, the insurance claim may include information regarding the individual's name and insurance policy number, start and end date of the insurance policy, description of an incident (e.g., hail damage from a thunderstorm), identification of damaged property (e.g., roof, window, auto, etc.), date and time of the incident, and the like. In some cases, the insurance claim may also include barometric data collected at the date and time of the incident. At step 402, the catastrophe resource system 202 may determine the geographic region of the insurance claim. For example, the catastrophe resource system 202 may access the GPS location of the mobile device 220 and use the geographic region in order to confirm the barometric data provided in the insurance claim by the individual. In some cases, the catastrophe resource system 202 may receive at least one of current GPS location data, GPS data from a time when an incident occurred (e.g., when a catastrophe hit), or all GPS data from the mobile device 220. For example, the catastrophe resource system 202 may determine a home location of the insured individual based on the GPS data obtained from the mobile device 220. In additional embodiments, the catastrophe resource system 202 may collect GPS data from the mobile device 220 when the insured individual submits an insurance claim, with the assumption that the insured individual is located at or near the damaged property (e.g., the individual is located at or near his or her house). At step 403, the catastrophe resource system 202 may access barometric data collected from other mobile devices 220 in the same geographic region. For example, the catastrophe resource system 202 may have previously collected the barometric data from the other mobile devices 220 and may store this barometric data in a database (e.g., database 206). The catastrophe resource system 202 may parse the barometric data in the database to identify data that corresponds to the same geographic region indicated by the insurance claim.

At step 404, the catastrophe resource system 202 may determine if the insurance claim data matches with the barometric data obtained from the other mobile devices in the same geographic region. For example, the catastrophe resource system 202 may determine if the barometric data from the insurance claim has similar pressure readings that are consistent with the values or patterns of the barometric data obtained from other mobile devices in the same region. If the insurance claim data matches with the barometric data obtained from the other mobile devices in the same geographic region, then the method in this example proceeds to step 405. At step 405, the catastrophe resource system 202 may verify the insurance claim to be valid and may proceed with regular claim processing.

If the insurance claim data does not match with the barometric data obtained from the other mobile devices in the same geographic region, then the method in this example proceeds to step 406. At step 406, the catastrophe resource system 202 may flag the claim as potentially fraudulent. For example, the catastrophe resource system 202 may store an identifier that marks the particular insurance claim as potentially fraudulent, in which the catastrophe resource system 202 may store this information in a database (e.g., database 206). At step 407, the catastrophe resource system 202 may proceed with additional processing of the insurance claim to determine whether or not the claim is actually fraudulent. For example, the catastrophe resource system 202 may send a claim adjuster to assess an individual's insurance claim, determine whether or not a property was actually damaged by a catastrophe, and/or determine whether or not the property was insured by the insurance company at the time of the catastrophe. In another example, the catastrophe resource system 202 may request for the individual to sign a statement under oath to verify that the damage to an insured property occurred recently during the insurance policy period.

In some cases, the sensors (e.g., sensors 225) of the mobile device 220 (e.g., the mobile device belonging to the individual who submitted the insurance claim) might not have accurately measured the barometric data at the time of a catastrophe. Thus, additional processing may allow the catastrophe resource system 202 to determine if damages to an insured property may in fact have been caused by a catastrophe and to determine whether damages are to be covered by the insurance company.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
a plurality of mobile devices, wherein each mobile device of the plurality of mobile devices comprises one or more sensors configured to collect barometric data and associated location data;
an insurance policy database; and
a server including one or more processors and at least one memory storing computer-readable instructions that, when executed by the one or more processors, cause the server to:
receive, from each mobile device of the plurality of mobile devices, the barometric data and the associated location data collected by the one or more sensors of each mobile device;
analyze the barometric data to determine an amount of change in atmospheric pressure associated with a catastrophic event;
determine, based on the associated location data, a geographic region affected by the catastrophic event;
estimate, based on the amount of change in the atmospheric pressure, a severity of the catastrophic event and a type and a number of catastrophe resources needed to handle insurance claims in the geographic region affected by the catastrophic event;
analyze first barometric data, of the barometric data, and associated first location data received from a first mobile device of the plurality of mobile devices;
estimate, based on the first barometric data and the associated first location data, a degree of property damage caused by the catastrophic event to an insured property associated with a user of the first mobile device;
determine, based on querying the insurance policy database, an insurance coverage amount associated with the insured property and a likelihood that an insurance claim related to the catastrophic event will be submitted for the insured property;
determine, based on the estimated degree of property damage, the insurance coverage amount, and the likelihood that the insurance claim will be submitted, a partial settlement amount to provide to the user; and
prior to the insurance claim being submitted, provide the partial settlement amount to the user.

2. The system of claim 1, wherein the barometric data comprises measurements of atmospheric pressure measured by the one or more sensors of each mobile device.

3. The system of claim 1, wherein the instructions further cause the server to:
compare, by the one or more processors, the first barometric data with one or more predefined threshold values for catastrophes; and
identify, by the one or more processors, that the first barometric data is below or above the predefined threshold values for catastrophes.

4. The system of claim 1, wherein the instructions further cause the server to:
determine, based on querying the insurance policy database, a number of insurance policies in the geographic region affected by the catastrophic event;
estimate the type and the number of catastrophe resources needed to handle the insurance claims in the geographic region affected by the catastrophic event further based on the determined number of insurance policies;

assign at least one of the catastrophe resources to each of the insurance policies in the geographic region affected by the catastrophic event; and send, by the one or more processors and to each of the plurality of mobile devices associated with the insurance policies in the geographic region affected by the catastrophic event, a notification regarding a catastrophe resource assignment, wherein each of the plurality of mobile devices associated with the insurance policies in the geographic region affected by the catastrophic event is further associated with an individual insured by a respective insurance policy offered by an insurance company.

5. The system of claim 4, wherein the catastrophe resources include coordinators, adjusters, processors, managers, and administrative personnel, and
wherein the adjusters include field adjusters, fast track adjusters, waiver adjusters, and damage site evaluators.

6. The system of claim 1, wherein the catastrophic event includes hurricanes, tsunamis, tornadoes, wildfires, floods, earthquakes, and severe storms.

7. The system of claim 1, wherein the one or more sensors comprise at least one of: a barometer, a thermometer, a global positioning system (GPS), a magnetometer, a gyroscope, an accelerometer, a compass, a temperature sensor, an infrared sensor, and an environmental sensor.

8. An apparatus comprising:
at least one processor;
a network interface configured to communicate, via a network, with a plurality of mobile devices; and
a memory storing computer-readable instructions that, when executed by the at least one processor, cause the apparatus to:
receive barometric data and associated location data from each mobile device of the plurality of mobile devices, wherein each mobile device comprises one or more sensors for collecting the barometric data and the associated location data;
analyze the barometric data to determine an amount of change in atmospheric pressure associated with a catastrophic event;
determine, based on the associated location data, a geographic region affected by the catastrophic event;
estimate, based on the amount of change in the atmospheric pressure, a severity of the catastrophic event and a type and a number of catastrophe resources needed to handle insurance claims in the geographic region affected by the catastrophic event;
analyze first barometric data, of the barometric data, and associated first location data received from a first mobile device of the plurality of mobile devices;
estimate, based on the first barometric data and the associated first location data, a degree of property damage caused by the catastrophic event to an insured property associated with a user of the first mobile device;
determine, based on querying an insurance policy database, an insurance coverage amount associated with the insured property and a likelihood that an insurance claim related to the catastrophic event will be submitted for the insured property;
determine, based on the estimated degree of property damage, the insurance coverage amount, and the likelihood that the insurance claim will be submitted, a partial settlement amount to provide to the user; and prior to the insurance claim being submitted, provide the partial settlement amount to the user.

9. The apparatus of claim 8, wherein the instructions further cause the apparatus to:
determine, based on querying the insurance policy database, a number of insurance policies in the geographic region affected by the catastrophic event;
estimate the type and the number of catastrophe resources needed to handle the insurance claims in the geographic region affected by the catastrophic event further based on the determined number of insurance policies; and
assign at least one of the catastrophe resources to each of the insurance policies in the geographic region affected by the catastrophic event,
wherein the catastrophe resources include coordinators, adjusters, processors, managers, and administrative personnel, and
wherein the adjusters include field adjusters, fast track adjusters, waiver adjusters, and damage site evaluators.

10. The apparatus of claim 8, wherein the catastrophic event includes hurricanes, tsunamis, tornadoes, wildfires, floods, earthquakes, and severe storms.

11. The apparatus of claim 8, wherein the one or more sensors comprise at least one of: a barometer, a thermometer, a global positioning system (GPS), a magnetometer, a gyroscope, an accelerometer, a compass, a temperature sensor, an infrared sensor, and an environmental sensor.

12. A method comprising:
receiving, by one or more computing devices, barometric data and associated location data from each mobile device of a plurality of mobile devices, wherein each mobile device comprises one or more sensors for collecting the barometric data and the associated location data;
analyzing the barometric data to determine an amount of change in atmospheric pressure associated with a catastrophic event;
determining, based on the associated location data, a geographic region affected by the catastrophic event;
estimating, based on the amount of change in the atmospheric pressure, a severity of the catastrophic event and a type and a number of catastrophe resources needed to handle insurance claims in the geographic region affected by the catastrophic event;
analyzing first barometric data, of the barometric data, and associated first location data received from a first mobile device of the plurality of mobile devices;
estimating, based on the first barometric data and the associated first location data, a degree of property damage caused by the catastrophic event to an insured property associated with a user of the first mobile device;
determining, based on querying an insurance policy database, an insurance coverage amount associated with the insured property and a likelihood that an insurance claim related to the catastrophic event will be submitted for the insured property;
determining, based on the estimated degree of property damage, the insurance coverage amount, and the likelihood that the insurance claim will be submitted, a partial settlement amount to provide to the user; and
prior to the insurance claim being submitted, providing the partial settlement amount to the user.

13. The method of claim 12, further comprising:
detecting, based on the analysis of the barometric data, the first barometric data indicative of an occurrence of the catastrophic event, wherein the detecting comprises:

comparing, by the one or more computing devices, the first barometric data with one or more predefined threshold values for catastrophes; and identifying, by the one or more computing devices, that the first barometric data is below or above the predefined threshold values for catastrophes.

14. The method of claim 12, further comprising:

determining, by the one or more computing devices and based on querying the insurance policy database, a number of insurance policies in the geographic region affected by the catastrophic event;

estimating, by the one or more computing devices, the type and the number of catastrophe resources needed to handle the insurance claims in the geographic region affected by the catastrophic event further based on the determined number of insurance policies;

assigning, by the one or more computing devices, at least one of the catastrophe resources to each of the insurance policies in the geographic region affected by the catastrophic event; and sending, by the one or more computing devices and to each of the plurality of mobile devices associated with the insurance policies in the geographic region affected by the catastrophic event, a notification regarding a catastrophe resource assignment, wherein each of the plurality of mobile devices associated with the insurance policies in the geographic region affected by the catastrophic event is further associated with an individual insured by a respective insurance policy, and wherein the catastrophe resources include coordinators, processors, managers, administrative personnel, field adjusters, fast track adjusters, waiver adjusters, and damage site evaluators.

15. The method of claim 12, wherein the barometric data comprises measurements of atmospheric pressure measured by the one or more sensors of each mobile device.

16. The method of claim 12, wherein the catastrophic event includes hurricanes, tsunamis, tornadoes, wildfires, floods, earthquakes, and severe storms.

17. The method of claim 12, wherein the one or more sensors comprise at least one of: a barometer, a thermometer, a global positioning system (GPS), a magnetometer, a gyroscope, an accelerometer, a compass, a temperature sensor, an infrared sensor, and an environmental sensor.

18. The system of claim 1, wherein the instructions further cause the server to:
store the barometric data and the associated location data collected by the one or more sensors of each mobile device;
receive, from the first mobile device, an insurance claim related to the catastrophic event and for an insured property associated with a user of the first mobile device; and
based on a determination that the first barometric data does not correspond to stored barometric data from other mobile devices, of the plurality of mobile devices, associated with the geographic region affected by the catastrophic event:
store an identifier identifying the insurance claim as potentially fraudulent; and
send a claim adjuster to the insured property to determine actual fraudulence.

19. The system of claim 2, wherein each of the plurality of mobile devices is configured to:
analyze the measurements of atmospheric pressure of the collected barometric data;
detect a weather event based on determining that the measurements of atmospheric pressure comprise values indicative of a weather event;
cache the barometric data for a duration of the weather event;
determine that the weather event has ended based on determining that the measurements of atmospheric pressure are within a predetermined range of values indicative of normal weather conditions; and
based on determining that the weather event has ended, send the cached barometric data to the server.

20. The method of claim 12, further comprising:
storing the barometric data and the associated location data collected by the one or more sensors of each mobile device;
receiving, from the first mobile device, an insurance claim related to the catastrophic event and for an insured property associated with a user of the first mobile device; and
based on a determination that the first barometric data does not correspond to stored barometric data from other mobile devices, of the plurality of mobile devices, associated with the geographic region affected by the catastrophic event:
storing an identifier identifying the insurance claim as potentially fraudulent; and
sending a claim adjuster to the insured property to determine actual fraudulence.

* * * * *